United States Patent
Wood

[11] Patent Number: 5,429,447
[45] Date of Patent: Jul. 4, 1995

[54] TURNBUCKLE ASSEMBLY

[75] Inventor: Ruey E. Wood, Harrison, Mich.

[73] Assignee: TRW Inc., Lyndhurst, Ohio

[21] Appl. No.: 931,869

[22] Filed: Aug. 18, 1992

[51] Int. Cl.⁶ .............................................. F16B 7/06
[52] U.S. Cl. ..................... 403/46; 403/290; 403/308; 403/314
[58] Field of Search ............. 403/43, 46, 45, 308, 403/314, 290; 285/92, 322, 323

[56] References Cited

U.S. PATENT DOCUMENTS

| | | |
|---|---|---|
| 1,016,835 | 2/1912 | Maurice et al. . |
| 1,102,782 | 7/1914 | Mills . |
| 1,421,866 | 7/1922 | Veeder . |
| 2,703,723 | 3/1955 | Hess . |
| 2,885,234 | 5/1959 | Larson . |
| 3,349,662 | 10/1967 | Williams . |
| 3,498,652 | 7/1968 | Cass . |
| 4,017,198 | 4/1977 | Mason ................... 403/43 |
| 4,093,388 | 6/1978 | MacArthur . |
| 4,172,676 | 10/1979 | DeChant . |
| 4,606,559 | 8/1986 | Rammelsberg ............ 285/308 X |
| 5,004,357 | 4/1991 | Wood . |

FOREIGN PATENT DOCUMENTS

| | | | |
|---|---|---|---|
| 151518 | 5/1953 | Australia ................. | 403/46 |
| 295718 | 4/1932 | Italy . | |
| 106625 | of 1917 | United Kingdom ......... | 403/290 |
| 343297 | 2/1931 | United Kingdom . | |
| 714774 | 9/1954 | United Kingdom ......... | 403/46 |

*Primary Examiner*—Randolph A. Reese
*Assistant Examiner*—Christopher J. Novosad
*Attorney, Agent, or Firm*—Tarolli, Sundheim & Covell

[57] ABSTRACT

A turnbuckle assembly (20) for a vehicle steering linkage (10) includes a sleeve (50), a nut (52) and a threaded rod (30). The sleeve (50) has a plurality of circumferentially spaced knobs (80) located on its outer surface (78). The nut (52) has a base portion (84) and a skirt portion (86). The base portion (84) of the nut (52) has an internal thread (90), and is received on the threaded rod (30). The skirt portion (86) of the nut (52) has an internal groove (98), and extends over the end portion (60) of the sleeve (50). The nut (52) is movable from a starting position to a clamping position. When the nut (52) is in its starting position, the knobs (80) on the sleeve (50) are received in the groove (98) in the nut (52). The knobs (80) and the groove (98) then establish a releasable mechanical interlock holding the nut (52) in its starting position.

4 Claims, 2 Drawing Sheets

U.S. Patent July 4, 1995 Sheet 1 of 2 5,429,447
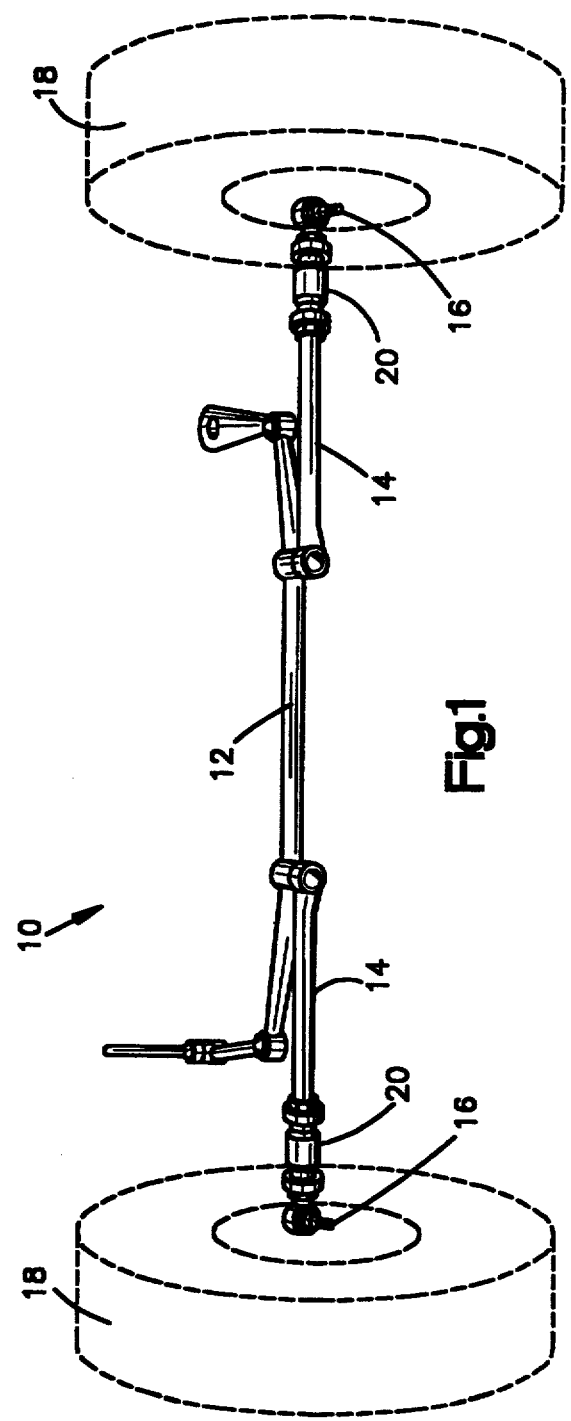
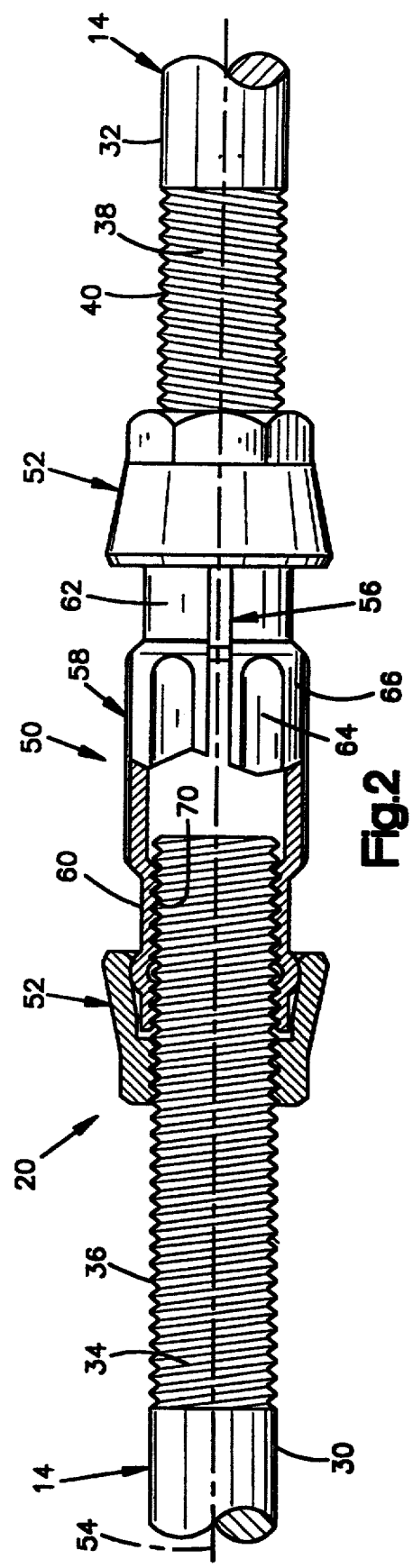

TURNBUCKLE ASSEMBLY

FIELD OF THE INVENTION

The present invention relates to a turnbuckle assembly, and particularly relates to a turnbuckle assembly in a vehicle steering linkage.

BACKGROUND OF THE INVENTION

U.S. Pat. No. 5,004,367 discloses a vehicle steering linkage including a turnbuckle assembly. The turnbuckle assembly includes a sleeve and a pair of nuts. The vehicle steering linkage further includes a tie rod having two separate sections. The turnbuckle assembly connects the two sections of the tie rod to each other. Each section of the tie rod has a threaded end portion which extends into a respective open end of the sleeve in engagement with a respective internal thread in the sleeve. The engaged threads at one end of the sleeve extend oppositely to the engaged threads at the other end of the sleeve. The tie rod sections are therefore moved axially toward or away from each other upon rotation of the sleeve relative to the tie rod sections. When a desired axial spacing between the tie rod sections is achieved, the nuts are tightened against the sleeve to clamp the sleeve against the tie rod sections, and thereby to fix the positions of the tie rod sections.

Each nut in the turnbuckle assembly has an inclined inner clamping surface, and each opposite end portion of the sleeve has an inclined outer clamping surface. When the nuts are tightened against the sleeve, the inclined inner clamping surfaces on the nuts move axially against the inclined outer clamping surfaces on the sleeve. The nuts then exert a clamping force radially inward against the end portions of the sleeve and the tie rod sections in the sleeve.

SUMMARY OF THE INVENTION

In accordance with the present invention, a turnbuckle assembly comprises a sleeve, a threaded rod and a nut. The sleeve has an axis, an end surface defining an opening, and an inner surface defining a screw thread. The sleeve also has an outer surface including a first blocking surface means. The threaded rod is received through the opening in the sleeve in threaded engagement with the screw thread in the sleeve. The nut has a first inner surface and a second inner surface. The first inner surface of the nut defines a screw thread engaged with the screw thread on the rod. The second inner surface of the nut extends over the outer surface of the sleeve, and includes a second locking surface means. The nut is movable axially into a clamping position in which it is tightened against the sleeve to fix the position of the rod in the sleeve.

The nut has a predetermined starting position spaced axially from the clamping position. When the nut is in its starting position, the second locking surface means on the nut is engaged with the first locking surface means on the sleeve to establish a releasable mechanical interlock between the nut and the sleeve. The mechanical interlock holds the nut in its starting position, and is releasable to permit axial movement of the nut from its starting position to its clamping position upon rotation of the nut relative to the rod and the sleeve.

In a preferred embodiment of the present invention, the end portion of the sleeve has a plurality of knobs extending radially outward. The first locking surface means on the sleeve comprises the outer surfaces of the knobs. The nut has a base portion and a skirt portion. The base portion of the nut has an internal thread for engaging the thread on the rod. The skirt portion of the nut extends axially over the end portion of the sleeve, and has an internal groove extending circumferentially around the end portion of the sleeve. The second locking surface means on the nut comprises the surface in the groove. When the nut is in its starting position on the sleeve, the knobs on the sleeve are received in the groove in the nut. The knobs and the groove thus establish the mechanical interlock between the nut and the sleeve.

In the preferred embodiment, the nut further has a frustoconical inner clamping surface adjacent to the groove. The inner clamping surface slides against the knobs on the sleeve when the nut advances axially over the sleeve upon rotation of the nut on the rod. The nut thus applies a radial clamping force against the sleeve progressively as the nut is being rotated on the rod.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a partially schematic view of a vehicle steering linkage including a turnbuckle assembly constructed in accordance with the present invention;

FIG. 2 is an enlarged partial view of parts of the apparatus of FIG. 1;

DESCRIPTION OF A PREFERRED EMBODIMENT

Figure 3:
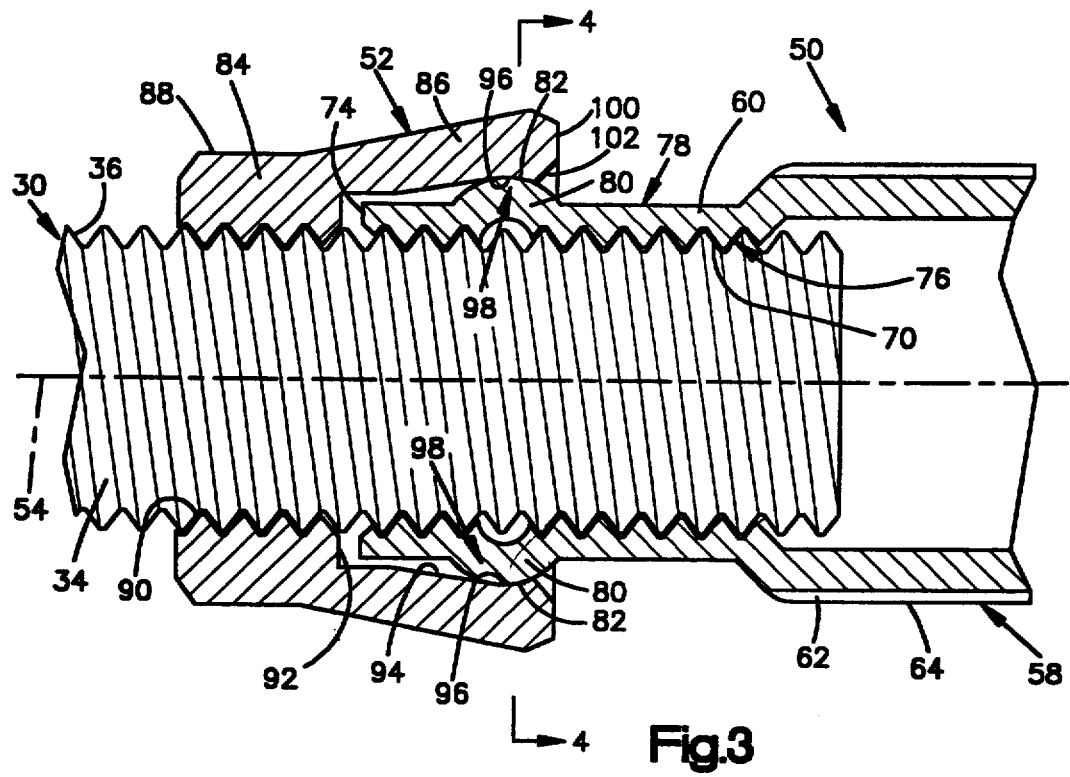
FIG. 3 is an enlarged partial view of the parts shown in FIG. 2.

A steering linkage 10 constructed in accordance with the present invention is shown in FIG. 1. The steering linkage 10 includes a center link 12. The center link 12 is movable longitudinally under the influence of a steering gear (not shown). A pair of tie rods 14 are connected to the center link 12, and a pair of ball joints 16 are connected to the tie rods 14. The ball joints 16 are also connected to a pair of steerable vehicle wheels 18 which are shown schematically in FIG. 1. The steering linkage 10 thus connects the steerable vehicle wheels 18 to the center link 12 to effect steering movement of the steerable vehicle wheels 18 upon longitudinal movement of the center link 12. The steering linkage 10 further includes a pair of turnbuckle assemblies 20 which are associated with the tie rods 14. The axial alignment of the steerable vehicle wheels 18 is adjusted by adjusting the turnbuckle assemblies 20.

The tie rods 14 are alike. Each tie rod 14 has two separate sections 30 and 32, as shown in FIG. 2. The first section 30 has an end portion 34 with a screw thread 36, and the second section 32 has an end portion 38 with a screw thread 40. The screw threads 36 and 40 extend on the first and second tie rod sections 30 and 32 in directions that are opposite to each other. The tie rods 14 are preferably formed of SAE 8115 steel, and may be supplied by Republic Steel Corp.

The turnbuckle assemblies 20 also are alike, and each includes a sleeve 50 and a pair of nuts 52 as shown in FIG. 2. The nuts 52 are preferably formed of SAE 1033 steel, and may be supplied by R.B. & W Manufacturing.

The sleeve 50 is formed from a rectangular stamped metal blank which is rolled into a tubular form. The sleeve 50 thus has a central axis 54 and a longitudinally extending seam 56 which is defined by adjacent edge surfaces of the metal blank. The sleeve 50 is preferably formed of SAE 950 steel supplied by Worthington Steel Co. with the trademark "MAXIFORM 50," but can be formed of any SAE/ASTM grade of stamping material suitable to meet the strength, ductility and formability requirements of the forming process and the final product application.

The sleeve 50 also has a radially enlarged central portion 58, a first open end portion 60, and a second open end portion 62. The central portion 58 has a plurality of longitudinally extending grooves 64 and ribs 66 which serve as adjustment grips so that the sleeve 50 can be grasped and rotated manually. The first open end portion 60 of the sleeve 50 has an internal screw thread 70. The second open end portion 62 similarly has an internal screw thread 70 which is not shown in the drawings. Like the screw threads 36 and 40 on the first and second tie rod sections 30 and 32, the internal screw threads 70 extend oppositely to each other.

The first and second tie rod sections 30 and 32 are receivable in the first and second open end portions 60 and 62 of the sleeve 50 in threaded engagement with the internal screw threads 70, as shown in FIG. 2. When the first and second tie rod sections 30 and 32 are received in the sleeve 50, the sleeve 50 is rotatable about the axis 54 relative to both of the tie rod sections 30 and 32 simultaneously. Because the threads extend oppositely as described above, the first and second tie rod sections 30 and 32 are moved axially toward each other upon rotation of the sleeve 50 in one direction, and are moved axially away from each other upon rotation of the sleeve 50 in the opposite direction. The effective length of the tie rod 14, and therefore the axial alignment of the associated steerable vehicle wheel 18 with the other steerable vehicle wheel 18, is thus adjusted by rotating the sleeve 50. When a desired axial spacing between the tie rod sections 30 and 32 is achieved, the nuts 52 are tightened against the sleeve 50 to clamp the sleeve 50 against the tie rod sections 30 and 32.

Figure 4:
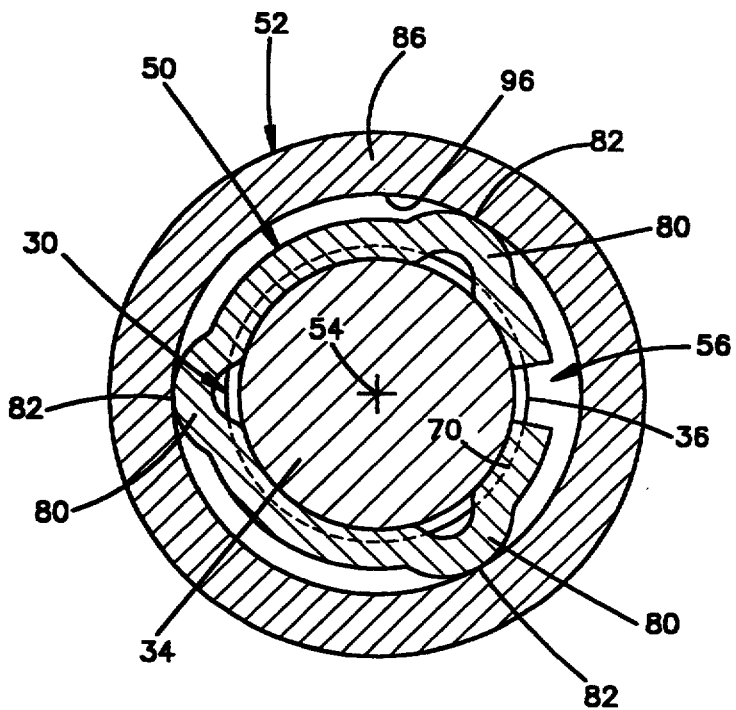
FIG. 4 is a view taken on line 4—4 of FIG. 3.

The first open end portion 60 of the sleeve 50, the associated nut 52, and the end portion 34 of the first tie rod section 30 are shown in greater detail in FIG. 3. The first open end portion 60 of the sleeve 50 has an annular end surface 74 which defines a circular opening through which the end portion 34 of the first tie rod section 30 is received. The first open end portion 60 also has a radially inner surface 76 and a radially outer surface 78. The radially inner surface 76 defines the internal screw thread 70. The radially outer surface 78 defines a plurality of knobs 80 which extend radially outward. Each of the knobs 80 has the same size and shape, including a spherically shaped outer surface 82. The knobs 80 are equally spaced axially from the annular end surface 74 of the sleeve 50, and are equally spaced from each other circumferentially as shown in FIG. 4.

As further shown in FIG. 3, the nut 52 has a cylindrical base portion 84 and a conical skirt portion 86 extending axially from the base portion 84. The base portion 84 of the nut 52 has a plurality of flat outer surface portions 88 to be grasped by a wrench, and has an internal screw thread 90 engaged with the thread 36 on the end portion 34 of the first tie rod section 30. The base portion 84 also has an annular inner surface 92 which faces the annular end surface 74 on the sleeve 50.

The skirt portion 86 of the nut 52 has a frustoconical inner surface portion 94 and an annular inner surface portion 96. The annular inner surface portion 96 has a spherical contour in cross-section as shown in FIG. 3, and thus defines a groove 98 extending circumferentially around the inside of the skirt portion 86 of the nut 52. The skirt portion 86 of the nut 52 also has an end surface 100 with a frustoconical inner edge portion 102.

The nut 52 is shown in FIG. 3 in a predetermined position in which it is initially mounted on the sleeve 50 before the first tie rod section 30 is inserted through the nut 52 and into the sleeve 50. The nut 52 is movable axially into its initially mounted position in a direction from the left to the right as viewed in FIG. 3. When the nut 52 is moved toward its initially mounted position, the frustoconical inner edge portion 102 is first moved into contact with the spherically shaped outer surfaces 82 on the knobs 80. The inner edge portion 102 slides against the outer surfaces 82 upon further axial movement of the nut 52 to the right, and forces the knobs 80 to move radially inward beneath the advancing nut 52. The longitudinally extending seam 56 in the sleeve 50 closes as necessary for the end portion 60 of the sleeve to collapse for such radially inward movement of the knobs 80. As the inner edge portion 102 on the nut 52 moves axially past the center of the knobs 80, the elasticity of the material of the sleeve 50 urges the knobs 80 to move radially back outward into the groove 98. The nut 52 is thus snapped into its initially mounted position on the sleeve 50.

When the nut 52 is snapped into its initially mounted position on the sleeve 50, a releasable mechanical interlock is established between the nut 52 and the sleeve 50 where the knobs 80 are received in the groove 98. The mechanical interlock will permit the nut 52 to rotate on the sleeve 50, but will block movement of the nut 52 axially from its initially mounted position unless it is overcome by a force sufficient to collapse the sleeve 50 radially beneath the nut 52 as described above. In the preferred embodiment of the invention, the diameter of the groove 98 is such that the knobs 80 return substantially to their original radial locations when the nut 52 is snapped into place. However, the diameter of the groove 98 can be reduced if a tighter fit is desired between the inner surface 96 in the groove 98 and the outer surfaces 82 on the knobs 80.

After the nut 52 is initially mounted on the sleeve 50, the threaded end portion 34 of the first tie rod section 30 is moved axially through the nut 52 and the open end of the sleeve 50 by rotating it in threaded engagement with the internal screw threads 90 and 70. When the axial position of the first tie rod section 30 is being adjusted, the nut 52 can rotate loosely relative to the sleeve 50 with the first tie rod section 30, but is held from moving axially out of its initially mounted position by the mechanical interlock.

After the first tie rod section 30 is moved axially into a position desired for alignment of the steerable vehicle wheels 18, the nut 52 is moved from its initially mounted position to a clamping position. Specifically, the nut 52 is rotated about the axis 54 relative to both the sleeve 50 and the first tie rod section 30 so as to move axially to the right from the position shown in FIG. 3. The frustoconical inner surface portion 94 of the nut 52 then moves against the spherical outer surfaces 82 on the knobs 80, and forces the knobs 80 to move radially inward beneath the advancing nut 52. The seam 56 in the sleeve 50 again closes slightly to permit such radially inward movement of the knobs 80. The internal screw thread 70 in the sleeve 50 is pressed radially against the underlying screw thread 36 progressively as the knobs 80 are moved radially inward. A clamping force is thereby progressively developed between the nut 52, the sleeve 50 and the first tie rod section 30.

The clamping force developed by the nut 52 is function of the slope of the inner surface portion 94 of the nut 52 and the axial distance that it moves against the outer surfaces 82 of the knobs 80. The clamping force can therefore be increased until the annular inner surface 92 of the nut 52 reaches the annular end surface 74 of the sleeve 50. Any substantial clearances then remaining between the engaged threads can be taken up by further tightening of the nut 52 axially against the sleeve 50. The nut 52 is thus moved into a clamping position in which it holds the first tie rod section 30 in an axial position desired for alignment of the steerable vehicle wheels 18. Importantly, the nut 52 is always located in its predetermined, initially mounted position when the clamping process is started because the mechanical interlock holds it in that position during adjustment of the first tie rod section 30. The clamping process is therefore simplified in accordance with the present invention because the nut always has the same starting position.

The other nut 52 on the second open end portion 62 of the sleeve 50 is snapped into an initially mounted position to establish a mechanical interlock between the associated groove 98 and knobs 80, and is further moved into a clamping position, in the same manner as described above with reference to the nut 52 on the first open end portion 60. In addition to holding the nuts 52 on the sleeve 50 before the first and second tie rod sections 30 and 32 are inserted, the mechanical interlocks also block movement of the nuts 52 axially off of the sleeve 50 after the tie rod sections 30 and 32 are inserted. This is because the inserted tie rod sections 30 and 32 prevent the sleeve 50 from collapsing radially inward to the extent that would be necessary for the inner edge portions 102 of the nuts 52 to move axially outward over the knobs 80. The nuts 52 are thus held securely on the sleeve 50 during both handling and use of the turnbuckle assembly 20 in the preferred embodiment of the present invention.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a sleeve having an axis, an end surface defining an opening, an inner surface defining a screw thread, and an outer surface;

a rod having a screw thread, said rod being receivable in an inserted position extending through said opening in said sleeve in threaded engagement with said screw thread in said sleeve;

a nut having a first inner surface and a second inner surface, said first inner surface defining a screw thread engageable with said screw thread on said rod when said rod is in said inserted position, said nut being movable axially over said sleeve in a first axial direction from a predetermined starting position to a clamping position upon rotation of said nut on said rod relative to said rod and said sleeve, said first axial direction extending along said sleeve from said opening in said sleeve; and said outer surface of said sleeve and said second inner surface of said nut respectively including first and second locking surface means for interlocking with each other to establish a mechanical interlock between said nut and said sleeve when said nut is in said predetermined starting position, said mechanical interlock latching said nut to said sleeve to block movement of said nut axially out of said predetermined starting position in said first axial direction and also to block movement of said nut axially out of said predetermined starting position in a second axial direction opposite to said first axial direction;

said mechanical interlock thus latching said nut to said sleeve and simultaneously permitting rotation of said nut relative to said sleeve when said rod is not received through said opening in said sleeve;

said mechanical interlock being releasable to permit movement of said nut in said first axial direction from said predetermined starting position to said clamping position upon rotation of said nut on said rod relative to said rod and said sleeve when said rod is in said inserted position.

2. Apparatus as defined in claim 1 wherein said sleeve has a plurality of knobs extending radially outward, said first locking surface means on said sleeve comprising radially outer surfaces of said knobs, said second locking surface means on said nut defining a groove into which said knobs extend when said nut is in said predetermined starting position.

3. Apparatus as defined in claim 2 wherein said knobs are equally spaced axially from said end surface of said sleeve, said second inner surface of said nut having a frustoconical clamping portion, said groove extending circumferentially entirely around said frustoconical clamping portion of said second inner surface of said nut.

4. Apparatus as defined in claim 3 wherein each of said knobs has a spherically shaped outer surface, said groove having a circular contour in an axially extending cross section.

* * * * *